United States Patent
Yoshimachi

(10) Patent No.: US 8,509,401 B2
(45) Date of Patent: Aug. 13, 2013

(54) MULTICAST TRANSMISSION SYSTEM AND DATA DISTRIBUTION METHOD

(75) Inventor: Hiroshi Yoshimachi, Tokyo (JP)

(73) Assignee: NEC Corporation, Tokyo (JP)

( * ) Notice: Subject to any disclaimer, the term of this patent is extended or adjusted under 35 U.S.C. 154(b) by 1324 days.

(21) Appl. No.: 11/410,376

(22) Filed: Apr. 25, 2006

(65) Prior Publication Data

US 2006/0240857 A1    Oct. 26, 2006

(30) Foreign Application Priority Data

Apr. 25, 2005   (JP) .................................. 2005-126468

(51) Int. Cl.
*H04W 4/10*   (2009.01)

(52) U.S. Cl.
USPC ................. 379/90.01; 379/92.02; 379/93.01; 455/518

(58) Field of Classification Search
USPC .......... 379/90.01, 92.01, 92.02, 92.03, 92.04, 379/93.01, 93.05, 93.06, 93.08; 725/24, 725/74; 340/825.64; 434/251; 705/1, 26

See application file for complete search history.

(56) References Cited

U.S. PATENT DOCUMENTS

| | | | | |
|---|---|---|---|---|
| 4,290,141 A | * | 9/1981 | Anderson et al. | 725/24 |
| 2004/0057449 A1 | * | 3/2004 | Black | 370/432 |
| 2005/0125246 A1 | * | 6/2005 | Muller et al. | 705/1 |

FOREIGN PATENT DOCUMENTS

| | | | |
|---|---|---|---|
| JP | 01-232837 | | 9/1989 |
| JP | 03-289725 | | 12/1991 |
| JP | 10-256985 | | 9/1998 |
| JP | 2002-041580 | | 2/2002 |
| JP | 2004-248145 | | 9/2004 |
| JP | 2005107682 A | * | 4/2005 |
| WO | WO 2005/091870 A2 | | 10/2005 |

* cited by examiner

*Primary Examiner* — Melur Ramakrishnaiah
(74) *Attorney, Agent, or Firm* — Scully, Scott, Murphy & Presser, P.C.

(57) ABSTRACT

A multicast transmission system includes a server and a plurality of terminal devices, the servers and the terminal devices connected through a network. Each terminal device includes data transmission means for transmitting data to the server during a PTT call, and output means for receiving counting result data from the server and outputting the counting result data. The server includes counting means for counting or tallying up data received from the terminal devices, and counting data transmission means for transmitting the counting result data to the terminal devices used by members of the PTT call.

48 Claims, 8 Drawing Sheets

| Group ID | User ID | Terminal ID number | Say |
|---|---|---|---|
| Group A | User A | 101 | Existing |
| Group A | User B | 102 | Not existing |
| Group A | User C | 103 | Not existing |
| Group B | User D | 104 | Not existing |
| Group B | User E | 105 | Existing |
| Group B | User F | 106 | Not existing |
| ... | ... | ... | ... |

| Group ID | User ID | Terminal ID number | Say | Response | Data to be tallied-up |
|---|---|---|---|---|---|
| Group A | User A | 101 | Existing | Existing | 1 |
| Group A | User B | 102 | Not existing | Not existing | |
| Group A | User C | 103 | Not existing | Existing | 2 |
| Group B | User D | 104 | Not existing | Existing | 1 |
| Group B | User E | 105 | Existing | Not existing | |
| Group B | User F | 106 | Not existing | Existing | 2 |
| . . . | . . . | . . . | . . . | | |

FIG. 9

MULTICAST TRANSMISSION SYSTEM AND DATA DISTRIBUTION METHOD

BACKGROUND OF THE INVENTION

1. Field of the Invention

The present invention relates to a multicast transmission system in which data collected from terminals during calls in multicast transmission is tallied up or compiled and the result of the tallying is distributed, and relates to a data distribution method in such a system.

2. Description of the Related Art

As the multicast transmission system for simultaneously transmitting a message to a plurality of partners, there has been a system using PoC (Push to talk over Cellular) in a mobile communication system. The PoC system is a system that principally uses mobile communication networks and is similar to a walkie-talkie. In the PoC system, a call is made in one-way, i.e., only in one direction.

Also, in the PoC system, like the IM (Instant Messaging) system, call partners can be grouped, and the statuses of the call partners can be observed. Therefore, in the PoC system, the partners in the call status are selected and a call button of a terminal is pushed, thereby enabling a call. In this case, the partner is one person or one group. In other words, the PoC system is similar to the transceiver mode in the mobile telephone. According to the PoC system, it is unnecessary to dial the number of the call destination, a time for connection is short, and the call can be made simultaneously with a plurality of points.

In the PoC system, the calling rate is often set cheaper than the usual call through circuit switching. In the operation procedure, a call destination list prepared in addition to the usual telephone book (i.e., address book) in the mobile telephone is opened, a partner is selected and decided in the call destination list, and then the call is started by pushing the call button. At this time, when a plurality of call destinations are selected, multi-position call is carried out.

Japanese Patent Laid-Open No. 3-289725 (JP, 3-289725A) proposes a technique to prevent the occurrence of data transmission error caused by the interrupt of the voice call and the interruption of the voice call caused by the interrupt of data communication and to prevent switching from the voice call mode to the data communication mode from being forgotten, in a communication system in which data communication and voice communication are performed between a common base station and a plurality of mobile stations. According to this technique, a base station having a data-only radio and a voice-only radio is opposed to a plurality of mobile stations each of which is provided with a data-cum-voice radio. Each mobile station transmits and receives data through a data-only circuit established between the mobile station and the data-only radio in the base station, and transmits and receives voice through a voice-only circuit established between the mobile station and the voice-only radio. The base station is configured to transmit the request data of the voice call to a desirable mobile station by using the data-only circuit. The mobile station is configured to be in the voice call mode, in which the voice-only circuit is used, only for a constant time after the press-to-talk switch is turned ON and to automatically return to the data communication mode, in which the data-only circuit is used, after the constant time elapses, thereby preventing the occurrence of data transmission errors and the interruption of voice call and also preventing the switching from the voice call mode to the data communication mode from being forgotten.

However, in the above-mentioned conventional PoC system, since voices of plural persons cannot be transmitted simultaneously, in order to confirm the intentions of call members while the call is in progress, the intention must be asked while the say is switched one by one, and thus it takes much time until all intentions of members are confirmed. Also, since only voice is multicast-distributed to the group participants, only the voice is communicated among the members. Therefore, expressions and statuses of the participants are hard to be transmitted. In order to confirm whether or not listeners whose faces cannot be viewed from the PTT (Push-To-Talk) speaker actually listen to the speaker's comment, it is necessary to get responses from the listeners.

SUMMARY OF THE INVENTION

Accordingly, it is an object of the present invention to provide a multicast transmission system capable of grasping intention indications of group members that are listeners while a call is in progress in the multicast transmission.

It is another object of the present invention to provide a data distribution method capable of grasping intention indications of group members that are listeners while a call is in progress in the multicast transmission.

The object of the present invention is attained by a multicast transmission system including a server and a plurality of terminal devices, wherein the serer and the plurality of terminal devices are connected through a network. Each terminal device is provided with data transmission means for transmitting data to the server during a PTT (push-to-talk) call, and output means for receiving counting result data from the server and outputting the counting result data. The server is provided with counting means for tallying or counting up the data received from the terminal devices, and counting data transmission means for transmitting the counting result data to the terminal devices used by members of the PTT call.

Another object of the present invention is attained by a data distribution method using a server and a plurality of terminal devices, wherein the server and the plurality of terminal devices are connected through a network. The method includes the steps of transmitting data from the terminal device to said server during a PTT call, tallying or counting up the data received from the terminal device in said server, transmitting counting result data to the terminal devices used by members of the PTT call from the server, and receiving the counting result data from the server at the terminal device and outputting the counting result data from the terminal device.

According to another aspect of the present invention, a program product for making a computer used as a server device connected to a network is provided, said program comprising instructions that cause the computer to perform the steps of tallying data received from terminal devices through said network and transmitting counting result data to the terminal devices used by members of a PTT call.

According to yet another aspect of the present invention, a program for making a computer used as a terminal device connected to a network is provided, said program comprising instructions that cause the computer to perform the steps of transmitting data to a server connected through said network during a PTT call and receiving counting result data from said server and outputting the counting result data.

According to the present invention, the intention indications of the group members that are listeners can be grasped while calls are made in the multicast transmission.

BRIEF DESCRIPTION OF THE DRAWINGS

FIG. 9 is a view showing one example of a configuration of a table stored with response information;

DETAILED DESCRIPTION OF PREFERRED EMBODIMENTS

Figure 1:
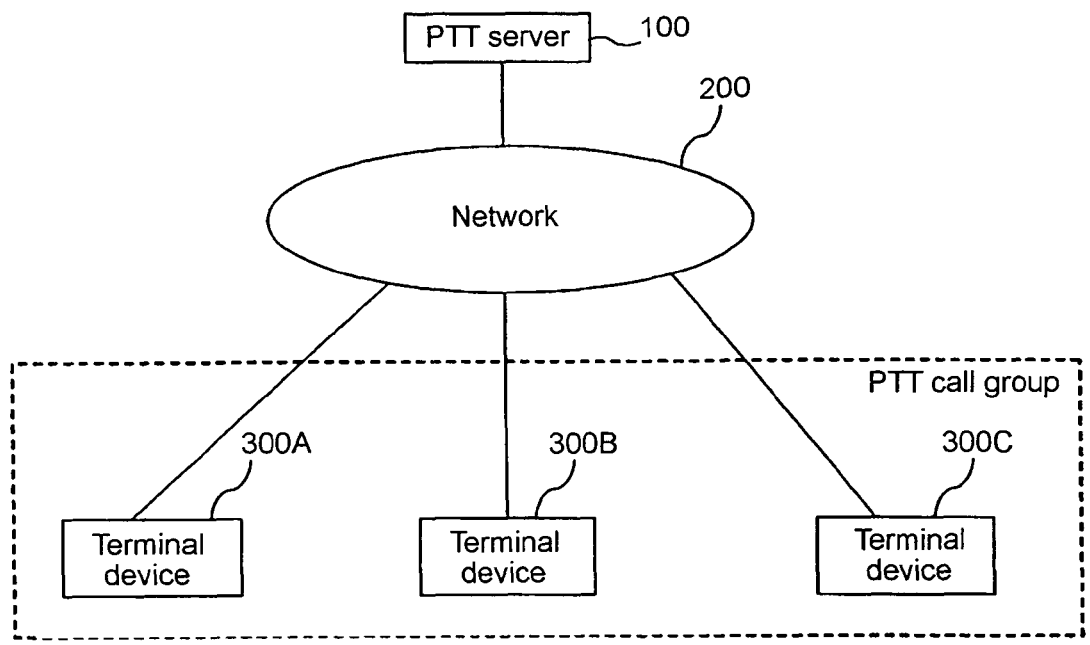
FIG. 1 is a block diagram showing a schematic configuration of a multicast transmission system according to a first embodiment of the present invention.

The multicast transmission system according to the first embodiment of the present invention shown in FIG. 1 is provided with PTT (push-to-talk) server 100, and terminal devices 300A, 300B, 300C. The server and the terminal devices operate by program control and are mutually connected through network 200. Network 200 is suitably the existing telephone network and the like, or may be any network, for example, optical fibers, the Internet, public circuits, LAN (Local Area Network), ADSL (Asymmetric Digital Subscriber Line). The communication scheme may be cable communication or wireless communication. The multicast transmission system makes the members of a call group possible to electronically poll or vote during a PTT call.

Figure 2:
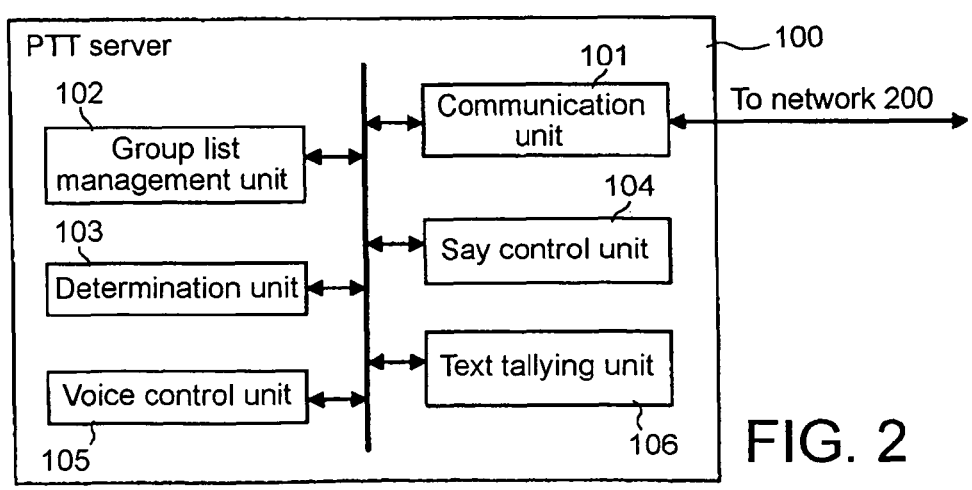
FIG. 2 is a block diagram showing a functional configuration of a PTT server.

PTT server 100 is an information processing apparatus used as a PTT (push-to-talk) platform to achieve the PoC. As shown in FIG. 2, PTT server 100 is provided with communication unit 101, group list management unit 102, determination unit 103, say control unit 104, voice control unit 105, and text tallying unit 106.

Communication unit 101 has a function of communicating with terminal devices 300A, 300B, 300C through network 200.

Figures 3, 4:
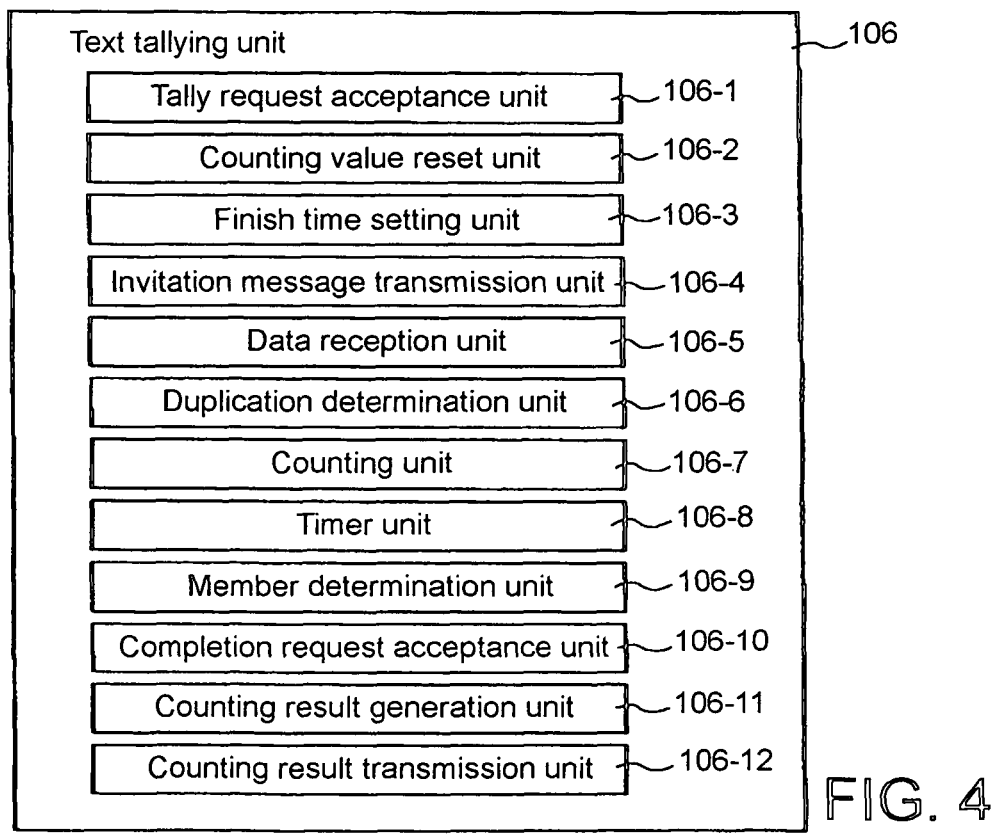
FIG. 3 is a view showing an example of a configuration of a group list.
FIG. 4 is a block diagram showing a functional configuration of a text tallying unit.

Group list management unit 102 has a function of managing the group list of the call group in the multicast transmission and executes processes, such as addition, update, and deletion of information on the group members. Here, FIG. 3 shows one example of the group list. Group ID is information used to identify call groups, and two groups, group A and group B exit in this example. User ID is information used to identify users who execute group calls in the multicast transmission, and six users, users A to F, exist, in this example. Terminal ID number is information used to identify terminal devices used by users who execute group calls in the multicast transmission, and numbers 101 to 106 are assigned in this example. "Say" box is information used to identify a user or a terminal device that has a say among the group members in the call group, and indicates to have a say in the case of "existing."

Determination unit 103 has a function of referring to the group list of group list management unit 102 and determining the terminal device of the call group, to which data from a speaker is transmitted.

Say control unit 104 has a function of giving a say in response to a say request from terminal devices 300A, 300B, 300C in the call group.

Voice control unit 105 has a function of transmitting the voice data of the speaker, which is input to the terminal device to which the say is given, to terminal devices 300A, 300B, 300C in the call group.

Text tallying unit 106 has a function of tallying up or compiling text data received from terminal devices 300A, 300B, 300C by type, and transmitting the counting result data to each terminal device in the call group. In other words, text tallying unit 106 counts the number of the data of each type. The data that is transmitted from each terminal device and is tallied or counted up is not limited to text data, and may be a flag, voice data, and image data of still images and moving images. For example, a mechanism for converting the numeral designated by voice into text data may be used, or a bar code may be specified by a readout as the text data.

FIG. 4 shows one example of the block diagram of text tallying unit 106 in further detail. Text tallying unit 106 is provided with tally request acceptance unit 106-1, counting value reset unit 106-2, finish time setting unit 106-3, invitation message transmission unit 106-4, data reception unit 106-5, duplication determination unit 106-6, counting unit 106-7, timer unit 106-8, member determination unit 106-9, completion request acceptance unit 106-10, counting result generation unit 106-11, and counting result transmission unit 106-12.

Tally request acceptance unit 106-1 has a function of accepting a tally request issued from the terminal device having the say.

Counting value reset unit 106-2 a function of clearing the counting value data which has been obtained by previous tallying process and resets the data. With this arrangement, when tallying or counting is executed plural times, it can be avoided that data is cumulated onto the previous counting value in error.

Finish time setting unit 106-3 has a function of setting the finish time of acceptance of data to be tallied or counted up, from each terminal device in the group. For example, "five minutes after invitation massage data is transmitted" may be set as the finish time. The finish time may be designated every time from the terminal device having the say or a value that is previously set in the system may be used.

Invitation message transmission unit 106-4 has a function of transmitting an invitation massage of execution of the tallying, that is, execution of a poll or vote, to each terminal device, based on the tally request issued from the terminal device having the say.

Data reception unit 106-5 receives data that is to be tallied or counted up, from each terminal device in the group.

Duplication determination unit 106-6 has a function of determining whether or not the data is received two or more times from the same terminal device. With this arrangement, for example, a possibility can be avoided in that duplicated data from the same terminal device is repeatedly tallied or counted up. Such a duplicated data may occurs when the mobile telephone is temporally into an out-of-service area during data transmission and then the data is retransmitted.

Counting unit 106-7 has a function of counting by type the number of data that is to be tallied and is received from each terminal device in the group.

Timer unit 106-8 has a function of determining whether a time elapses or not, and the time is set by finish time setting unit 106-3 to finish reception of data to be tallied from each terminal device.

Member determination unit 106-9 has a function of distinguishing between a terminal device from which data to be tallied has been already received and a terminal device from which no data is received, among the terminal devices used by the group member in the call group.

Completion request acceptance unit 106-10 has a function of accepting a completion request issued from the terminal device having the say.

Counting result generation unit 106-11 has a function of generating transmission data which is a counting result to be transmitted to each terminal device.

Counting result transmission unit 106-12 has a function of transmitting the transmission data that is the counting result generated by counting result generation unit 106-11, to each terminal device.

It should be noted that text tallying unit 106 may be configured such that another functional block is added to the functional blocks shown in FIG. 4.

Figure 5:
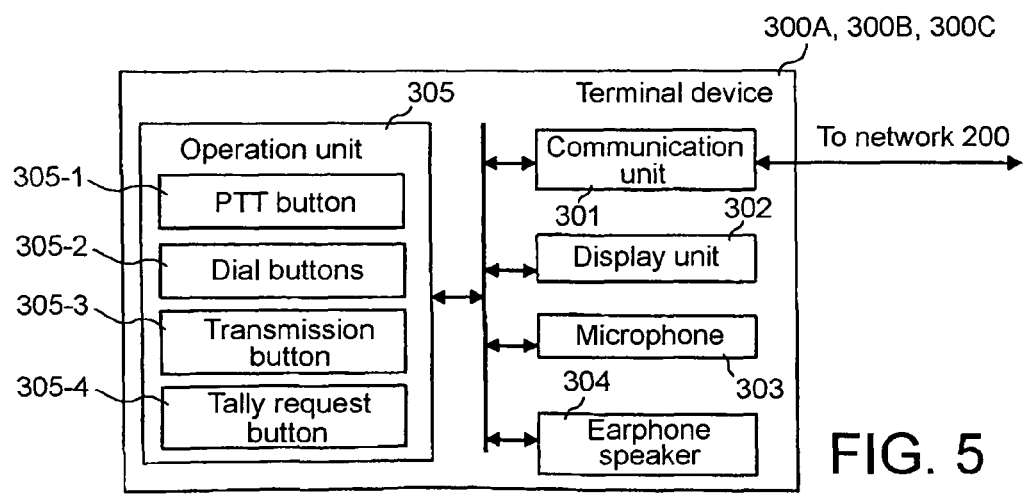
FIG. 5 is a block diagram showing a functional configuration of a terminal device.

Terminal devices 300A, 300B, 300C are clients using the PoC service, and are, for example, notebook-sized personal computers, mobile telephones, PHS, PDA (Personal Digital Assistant), or the like. Such a terminal device is provided with communication unit 301, display unit 302, microphone 303, earphone speaker 304, and operation unit 305, as shown in FIG. 5.

Figure 6:
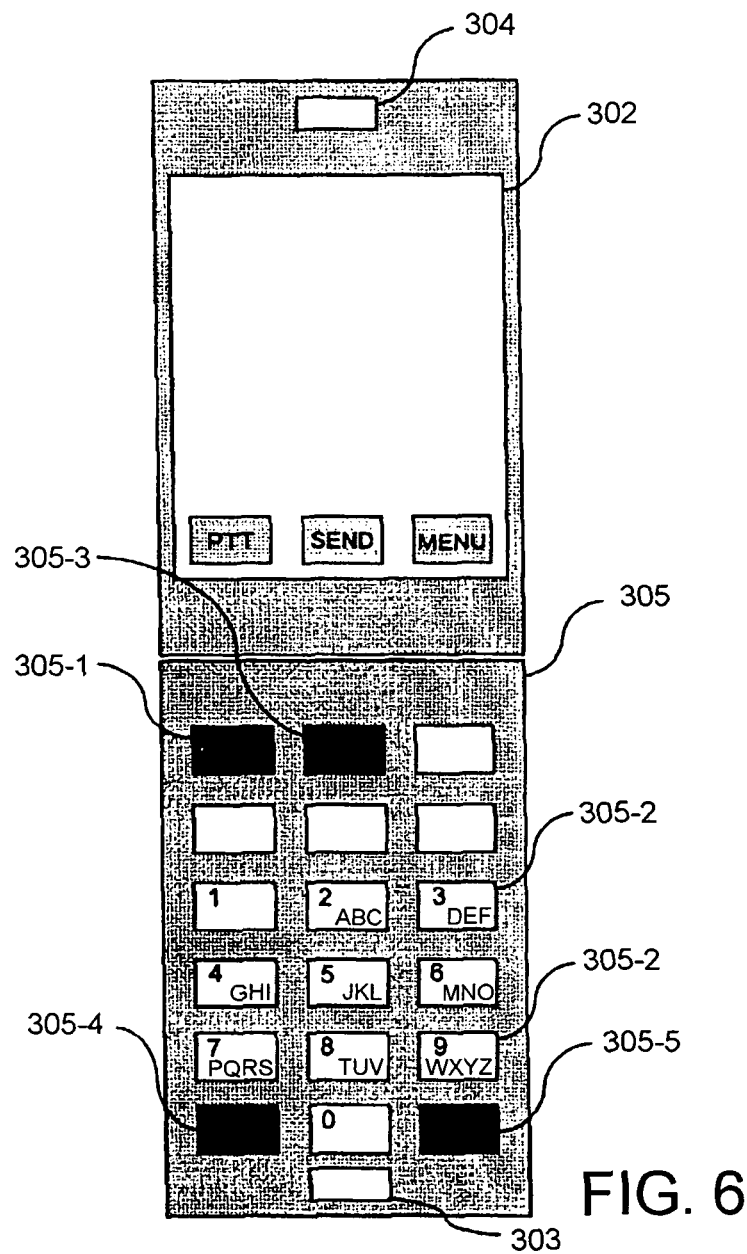
FIG. 6 is a view showing the entire configuration of a mobile telephone which is one example of the terminal device.

FIG. 6 shows a schematic configuration view of a mobile telephone that is one example of terminal devices 300A, 300B, 300C. The mobile telephone is provided with liquid crystal display unit 302, microphone 303, earphone speaker 304, and operation unit 305. Further, operation unit 305 is provided with PTT button 305-1, dial buttons 305-2, transmission button 305-3, tally request button 305-4, and finish button 305-5. Hereinafter, detailed explanations are given of the terminal device with reference FIGS. 5 and 6.

Communication unit 301 has a function of communicating with PTT server 100 through network 200.

Display unit 302 has a function of displaying text data, image (still and moving image) data and the like received from PTT server 100, and displaying character data that is input into its terminal device by pushing dial button 305-2 in operation unit 305. Display unit 302 is implemented by, for example, CRT or LCD (liquid crystal display). In the mobile telephone shown in FIG. 6, the upper half of the collapsible body of the mobile telephone is used as liquid crystal display unit 302.

Microphone 303 has a function of capturing voice of the speaker in its terminal device as voice data. In the mobile telephone shown in FIG. 6, microphone 303 is configured together with a mouthpiece that is used for a usual call.

Earphone speaker 304 has a function of reproducing sound data including the voice data received from PTT server 100. In the mobile telephone shown in FIG. 6, earphone speaker 304 is configured together with an earpiece used for a usual call.

Operation unit 305 is provided with PTT button 305-1, dial buttons 305-2, transmission button 305-3, tally request button 305-4, and finish bottom 305-5. In the mobile telephone shown in FIG. 6, operation unit 305 is configured as the lower half of the collapsible body of the mobile telephone.

When a user pushes PTT button 305-1, a request for a say is made to PTT server 100. In the mobile telephone shown in FIG. 6, PTT button 305-1 is allocated to one button at the left end of the uppermost stage out of general function buttons.

When dial button 305-2 is pushed, character (text) data are input into its terminal device. In the mobile telephone shown in FIG. 6, dial buttons 305-2 are configured as ten buttons that are usually used to input telephone numbers or to input text data, such as e-mail data. One of numerals 1 to 9 and 0, and characters are assigned to each of ten buttons.

When transmission button 305-3 is pushed, the text data which has been already entered by pushing dial button 305-2 is transmitted to PTT server 100. In the mobile telephone shown in FIG. 6, transmission button 305-3 is allocated to one button at the center of the uppermost stage out of general function buttons.

When the user pushes tally request button 305-4, a tally request is issued to PTT server 100. In the mobile telephone shown in FIG. 6, tally request button 305-4 is allocated to a button indicated as "*" at the left end of the lowermost stage. Additionally, in the mobile telephone shown in FIG. 6, finish button 305-5 is allocated to a button indicated as "#" at the right end of the lowermost stage. When finish button 305-5 is pushed, a completion request may be issued to PTT server 100.

Figure 7:
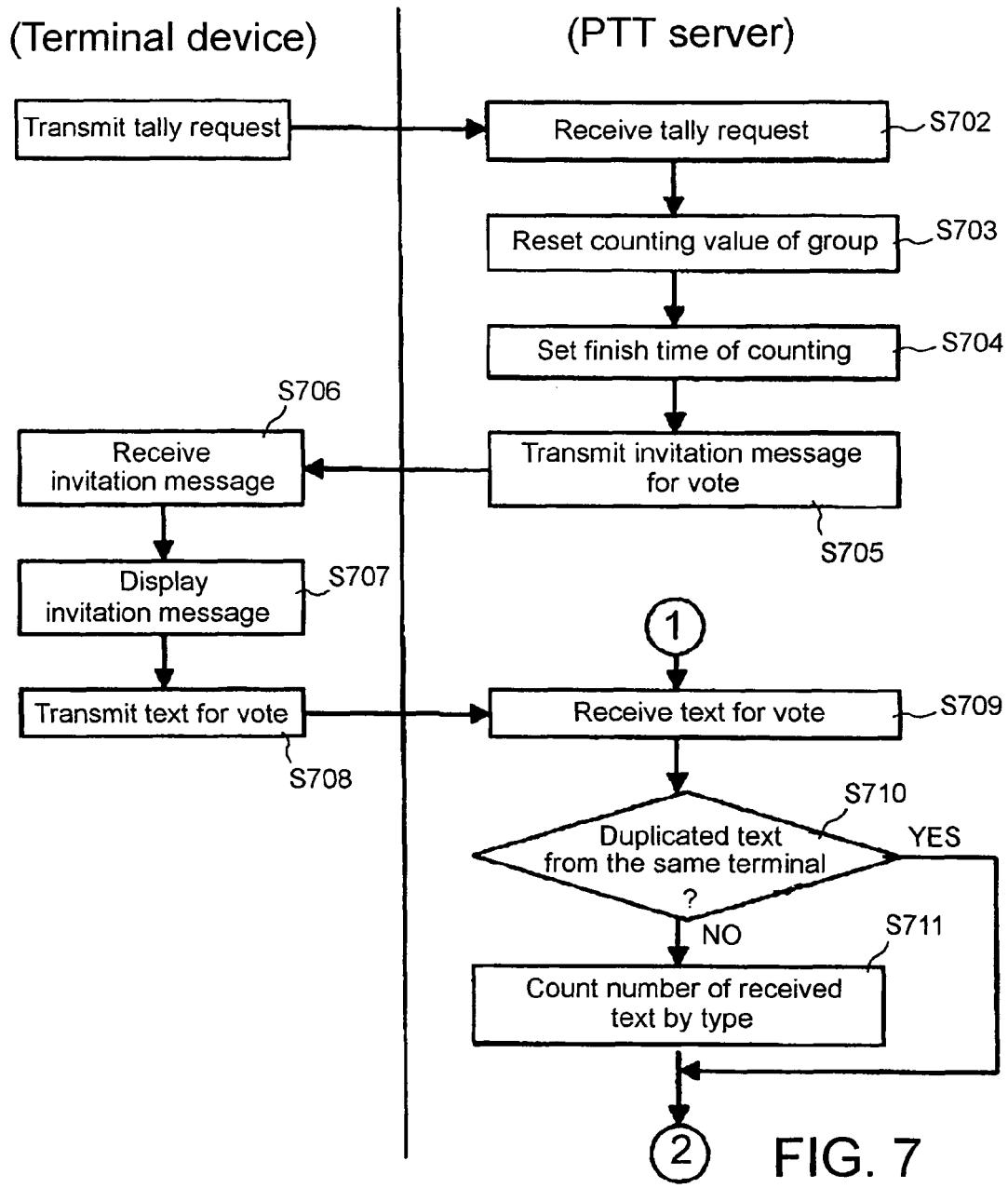
FIG. 7 is a sequence diagram showing a tallying process of data.
Figure 8:
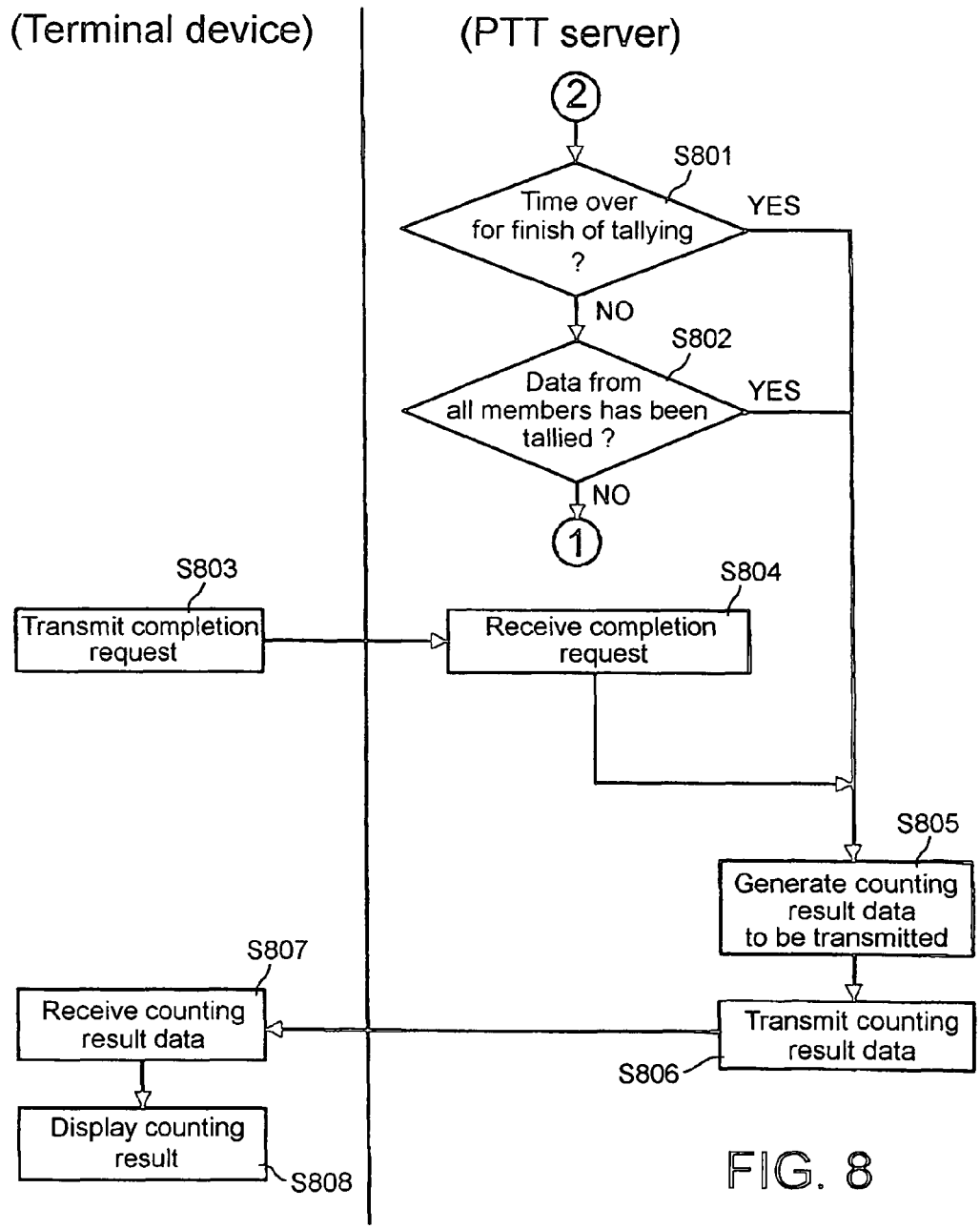
FIG. 8 is a sequence diagram showing the tallying process of data.

Next, detailed explanations are given of the process operation of tallying or counting up the data from the group members in the call group according to the first embodiment with reference to the sequence diagrams of FIGS. 7 and 8. In this description, assuming that a person having a say, i.e., user A using terminal device 300A wants to ask the group members about intentions of approval or objection when the multicast communication is performed. In this description it is assumed that, in terminal device 300A, PTT button 305-1 has been pushed and a request for a say has been made to PTT server 100.

First, explanations are given of the process operation until the person having the say informs the group members in the call group of the invitation of tallying or compilation of text data, and informs them of the dial button corresponding to the intention of approval or objection, with reference FIG. 7.

Communication unit 301 in terminal device 300A issues a tally request to PTT server 100 through network 200 in step S701 when tally request button 305-4 is pushed. In this description, assuming that five minutes from transmission of the invitation is designated as the finish time of the tallying process. The designation of the finish time is simultaneously made upon the transmission of the invitation message. Incidentally, if necessary, a text message for explanation, such as a dial button name that corresponds to the intention of approval or objection, may be simultaneously transmitted from terminal device 300A to PTT server 100. Alternatively, the speaker having the say may input the invitation and the explanation of the dial button name corresponding to the intention of approval or objection into microphone 303 of its terminal device 300A by voice, and the voice data input through microphone 303 may be then transmitted to PTT server 100. In this description, it is assumed that the text message explains that "1" of dial button 305-2 is designated for the intention is approval and "2" of dial button 305-2 is designated for the intention is objection is transmitted.

Communication unit 101 in PTT server 100 passes the tally request received from terminal device 300A through network 200 to tally request acceptance unit 106-1 in its server, and tally request acceptance unit 106-1 accepts the tally request issued by terminal device 300A in step S702. Then, counting value reset unit 106-2 in PTT server 100 clears the counting value data that has been obtained last time and resets data in step S703. Successively, in step S704, finish time setting unit 106-3 in PTT server 100 sets the finish time which has been received from terminal device 300A in step S701, i.e., the value of five minutes from transmission of the invitation, as the time to finish reception of data to be tallied up from each terminal device in the group.

Determination unit 103 in PTT server 100 refers to the group list of group list management unit 102 and determines terminal devices in the call group, to which the voice data of the speaker received from terminal device 300A is transmitted. Invitation transmission unit 106-4 in PTT server, in step S705, transmits the invitation message for initiation of tallying or a vote to each terminal device in the call group, based on the tally request received from terminal device 300A. Referring to the group list shown in FIG. 3, in this description, since user A using terminal device 300A belongs to group A, the invitation message is transmitted to terminal devices 300B, 300C in the call group, based on terminal ID numbers 102, 103 of terminal devices 300B, 300C belonging to group A.

Terminal devices 300B, 300C, in step S706, receive the invitation message for initiation of tallying or vote from PTT server 100 through network 200. Display units 302 of terminal devices 300B, 300C, in step S707, display the invitation message received from PTT server 100. Further, display units 302 of terminal devices 300B, 300C display text messages for explanation that "1" of dial button 305-2 is designated for approval and "2" of dial button 305-2 for objection. Incidentally, it is not necessary to coincide the transmission timing of the invitation message for tallying with the start of the tallying by the transmission of text messages for explanation. First, the invitation message for tallying may be transmitted, and then the tallying may be started by transmission of text messages for explanation.

Alternatively, earphone speakers 304 of terminal devices 330B, 300C may reproduce the received voice data of the speaker to inform the call group members of the invitation of text tallying or voting, and the dial button name corresponding to approval or objection.

Next, explanations are given of the counting process operation of approval or objection intention of the group members in the call group, with reference to FIGS. 7 and 8. The process in terminal device 300B is basically similar to that in terminal device 300C, and therefore explanations of terminal device 300B are given below.

When transmission button 305-3 of terminal device 300B is pushed, the text data which has been already entered by pushing dial button 305-2 is transmitted to PTT server 100 through communication unit 301 and network 200 in step S708. In this description, assuming that character (text) data is entered into terminal device 300B when dial button 305-2 of terminal device 300B is pushed. In other words, a participant pushes "1" of dial button 305-2 when approval and pushes "2" of dial button 305-2 when objection. It should be noted that, for example, as additional data, a nickname of the user may be added to the data to be transmitted, as shown in FIG. 9. Needless to say, additional data includes sound data and image data in addition to the text data.

The same process is also executed in terminal device 300C. Additionally, the same process may be executed in terminal device 300A that issues the tally request.

Next, data reception unit 106-5 in PTT server 100, in step S709, receives data that is to be tallied from terminal devices 300B, 300C in the call group through communication unit 101 and network 200. Duplication determination unit 106-6 in PTT server 100, in step S710, determines whether or not duplicated data is received from the same terminal device. This determination is performed by judging the identity between the terminal identification number and the content of received data. When it is judged in step S710 that duplicated data is received from the same terminal device, the process is advanced to step S801. On the other hand, when it is judged in step S710 that no duplicated data is received from the same terminal device, counting unit 106-7 in PTT server 100 counts the number of data that is received from each terminal device in the group and is to be tallied, by type, in step S711. In other words, "1" that indicates the intention of approval and "2" that indicates the intention of objection are respectively counted out of the received data.

After that, in step S801 timer unit 106-8 in PTT server 100 determines whether or not the time that is set by finish time setting unit 106-3 and is to finish acceptance of data to be tallied from each terminal device, i.e., five minutes from transmission of the invitation message, elapses. When it is determined in step S801 that five minutes elapse after the invitation message is transmitted, the process is advanced to step S805.

On the other hand, when it is determined in step S801 that five minutes does not elapse after the invitation message is transmitted, member determination unit 106-9 in PTT server 100 determines whether data from all group members in the call group is tallied or not. This determination may be performed by storing information of data that indicates whether a response is made or not every terminal device into the table shown in FIG. 9 and by referring to the table. The information stored in the table shown in FIG. 9 also includes data to be tallied for every terminal device which has made the response. When it is determined in step S802 that data from each of all group members in the call group is tallied or counted up, the process is advanced to step S805. On the hand, when it is not determined in step S802 that data from some group members in the call group is not tallied, the process is returned to step S709, and the above-mentioned processes from step S709 are repeated.

Further, when finish button 305-5 in terminal device 300A that is the terminal device having the say is pushed and the completion request is issued to PTT server 100 in step S803, completion acceptance unit 106-10 in PTT server 100 receives the issued completion request through communication unit 101 and network 200, in step S804. After that, the process is advanced to step S805. In other words, though data is being tallied or counted up in steps S709 to S802, the data tallying process is forcefully interrupted by the completion request and is finished.

In this way, the data tallying process is finished when one is satisfied out of three requirements (a) to (c): that is, (a) the elapse of the finish time in step S801; (b) the completion of tallying data for all group members in step S802; and (c) the acceptance of the completion request in step S804, and the process is advanced to step S805.

In step S805, when the data tallying process is finished, counting result generation unit 106-11 in PTT server 100 generates transmission data that is to be transmitted to the terminal devices used by the group members in the call group, based on the counting result until that time. At this time, the display format of the counting result is designated and additional information is attached. After that, determination unit 103 in PTT server 100 refers to the group list in group list management unit 102 and determines a terminal device in the call group, to which the transmission data generated by counting result generation unit 106-11 is transmitted. Counting result transmission unit 106-12 in PTT server 100 transmits, in step S806, the transmission data to terminal devices 300A, 300B, 300C used by the group members in the call group through communication unit 101 and network 200. The transmission data may be transmitted to all terminal devices used by group members in the call group, may be limitedly transmitted to the terminal devices that have already made responses, or may be transmitted only to other specific terminal devices.

Figure 10:
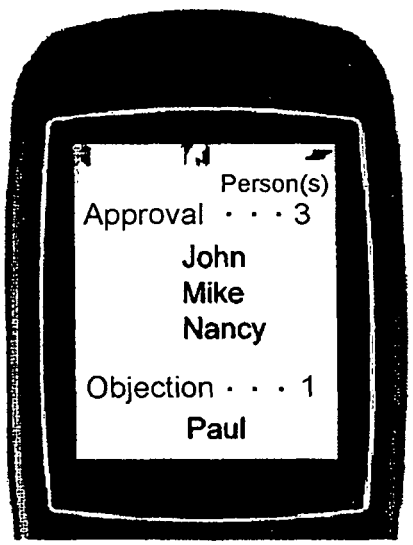
FIG. 10 is a view showing a screen display example of the terminal device according to the first embodiment.

Communication units 301 of terminal devices 300A, 300B, 300C, in step S807, receive counting result data from PTT server 100 through network 200 and, in step S808, display the counting result data on display units 302 of terminal devices 300A, 300B, 300C, for example, as shown in FIG. 10.

The display format may be any format as far as the counting result data can be output. For example, still images or moving images are displayed on the predetermined display unit, the sound data may be reproduced from earphone speaker 304, or data, to which some process is applied, may be passed to another processing unit.

According to the first embodiment, the intentions of PTT group members who are listeners can be grasped while a PTT call is in progress. As its reason, text data can be transmitted and received during the PTT call, differently from the case in that voices of plural persons cannot be transmitted simultaneously, the intention indication of approval or objection can be changed into text so as to be transmitted, and therefore the intentions of the PTT call group members can be confirmed in a short time.

Figure 11:
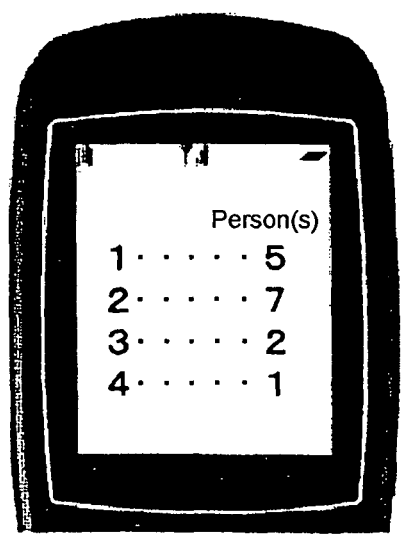
FIG. 11 is a view showing a screen display example of the terminal device according to a second embodiment of the present invention.

Next, the second embodiment of the present invention is explained. The configuration of the multicast transmission system of the second embodiment is basically similar to that of the multicast transmission system of the first embodiment, however, the multicast transmission system of the second embodiment differs in the number of alternatives in the data to be transmitted to PTT server 100. In other words, in the first embodiment, there are two alternatives, that is, "1" of dial button 305-2 is designated when the intention is approval and "2" of dial button 305-2 is designated when the intention is objection, whereas, in the second embodiment, the number of alternatives is three or more. Since the number of alternatives is three or more, the counting result data that is to be displayed on display units 302 of terminal devices 300A, 300B, 300C in step S807 in FIG. 8, for example, is shown in FIG. 11 in the second embodiment.

According to the second embodiment, the intentions of group members can be confirmed and decision can be made by majority out of three or more alternatives while the PTT group call is in progress among the group members. Also, it can be used as answer means of quizzes set in the PTT group call. Further, it can be used as means for compiling or counting orders of items such as goods or services for group members.

Figure 12:
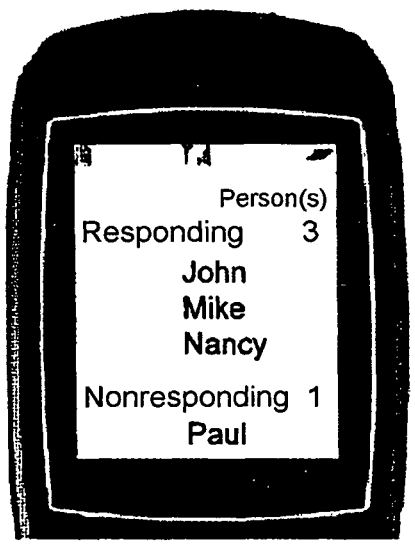
FIG. 12 is a view showing a screen display example of the terminal device according to a third embodiment of the present invention.

Next, the third embodiment of the present invention is explained. The configuration of the multicast transmission system of the third embodiment is basically similar to that of the multicast transmission system of the first embodiment, however, the multicast transmission system of the third embodiment differs in that tallying is performed in terms of the existence or absence of a response, not which alternative is selected. Since tallying is performed in accordance with the existence or absence of a response, the transmission data generated by counting result generation unit 106-11 in PTT server 100 in step S805 in FIG. 8 may made by respectively counting terminal devices that made responses and terminal devices that have made no response with reference to the table shown in FIG. 9. In the third embodiment, the counting result data that is to be displayed on display units 302 of terminal devices 300A, 300B, 300C, for example, is shown in FIG. 12.

According to the third embodiment, it is available to roll call means for each group in a group activity.

As descried above, the preferred embodiments of the present invention are explained, these embodiments are preferred embodiments of the present invention, and may be variously modified within the scope of the present invention. For example, a computer program carrying out functions of PTT server 100, terminal device 300A, and the like in each above-mentioned embodiment may be read into a computer and be executed, and these functions of these devices thus may be implemented. Such a program may be transmitted to another computer through CD-ROM or magneto-optical disk, which are computer readable storage media, or by transmission waves through the Internet, telephone circuits, or wireless circuit, which are transmission media.

In each of the above-mentioned embodiments, explanations are give of the example of the system configuration in that PTT server 100, terminal device 300A, and the like are separately connected to the network. However, needless to say, the present invention is available to a configuration in which each function is carried out as one computer system, and a configuration in which a plurality of server devices is added for each function.

What is claimed is:

1. A multicast transmission system comprising:
a server; and
a plurality of terminal devices,
wherein said server and said plurality of terminal devices are connected through a network,
wherein each of said terminal devices comprises: data transmission means for transmitting data to said server during a PTT call, and output means for receiving counting result data from said server and outputting the counting result data, and
wherein said server comprises a group list management unit comprising at least a say for each of said terminal devices, the say set to EXISTING during the PTT call, counting means for tallying data received from said terminal devices, and counting data transmission means for transmitting the counting result data to each of the terminal devices having the say of EXISTING in the group list management unit.

2. The system according to claim 1, wherein said terminal device comprises tally request means for issuing a tally request to said server, and wherein said counting means tallies up the data when the tally request is issued from said terminal device.

3. The system according to claim 1, wherein said server further comprises invitation transmission means for transmitting invitation message data to said terminal device, and wherein said output means outputs an invitation message when the invitation message data is received from said server.

4. The system according to claim 1, wherein said counting means tallies up the data received within a predetermined time.

5. The system according to claim 1, wherein said counting means tallies up data which has been selected by said terminal device among a plurality of alternatives.

6. The system according to claim 1, wherein said counting means separately counts up a terminal device that makes a response and counts up a terminal device that makes no response.

7. The system according to claim 1, wherein said terminal device comprises completion request means for issuing a completion request of a tallying process of data to said server, and wherein said counting means completes the tallying process of data when the completion request is issued from said terminal device.

8. The system according to claim 1, wherein said server comprises generation means for generating data that is to be transmitted to said terminal device, based on the data tallied by said counting means.

9. The system according to claim 1, wherein said server comprises reset means for clearing previous counting value data.

10. The system according to claim 1, wherein the data transmitted from said data transmission means to said server is text data.

11. A server device comprising:
a group list management unit comprising at least a say for each of a plurality of terminal devices, the say set to EXISTING during a PTT call;
counting means for tallying data received from the terminal devices during the PTT call, wherein said terminal devices are connected to said server through a network, and
counting data transmission means for transmitting counting result data to each of the terminal devices having the say of EXISTING in the group list management unit.

12. The device according to claim 11, wherein said counting means tallies up the data when a tally request is issued from said terminal device.

13. The device according to claim 11, further comprising invitation transmission means for transmitting invitation message data to said terminal device.

14. The device according to claim 11, wherein said counting means tallies up data received within a predetermined time.

15. The device according to claim 11, wherein said counting means tallies up data which has been selected by said terminal device among a plurality of alternatives.

16. The device according to claim 11, wherein said counting means separately counts up a terminal device that makes a response and counts up a terminal device that makes no response.

17. The device according to claim 11, wherein said counting means completes a tallying process of data when a completion request is issued from said terminal device.

18. The device according to claim 11, further comprising generation means for generating data that is to be transmitted to said terminal device, based on the data tallied by said counting means.

19. The device according to claim 11, further comprising reset means for clearing previous counting value data.

20. The device according to claim 11, wherein the data which is received by said counting means from said terminal devices and is to be tallied is text data.

21. A terminal device comprising:
data transmission means for transmitting data to a server during a PTT call, said server connected to the terminal device through a network, said server comprising a group list management unit comprising at least a say for the terminal, the say set to EXISTING during the PTT call, and
output means for receiving counting result data from said server when the say is EXISTING in the group list management unit, and outputting the counting result data, the counting result data being obtained in said server through a tallying process of the data which is received by said server.

22. The device according to claim 21, further comprising tally request means for issuing a tally request to said server.

23. The device according to claim 21, wherein said output means outputs an invitation message when invitation message data is transmitted from said server.

24. The device according to claim 21, further comprising completion request means for issuing a completion request of a tallying process to said server.

25. The device according to claim 21, wherein data transmitted from said data transmission means to said server is text data.

26. A data distribution method using a server and a plurality of terminal devices, said server and said plurality of terminal devices being connected through a network, said method comprising the steps of:
transmitting data from said terminal devices to said server during a PTT call, said server comprising a group list management unit comprising at least a say for each of said terminal devices, the say set to EXISTING during the PTT call;
tallying the data received from said terminal devices in said server;
transmitting counting result data from said server to each of the terminal devices having the say of EXISTING in the group list management unit; and
receiving said counting result data from said server at said terminal device and outputting the counting result data from said terminal device.

27. The method according to claim 26, further comprising a step of issuing a tally request from said terminal device to said server, wherein the data is tallied in said server when the tally request is issued from said terminal device.

28. The method according to claim 26, further comprising a step of transmitting invitation message data from said server to said terminal device, wherein said terminal device outputs an invitation message when the invitation message data is transmitted from said server.

29. The method according to claim 26, wherein data received within a predetermined time is tallied up in said server.

30. The method according to claim 26, wherein data which has been selected by said terminal device among alternatives is tallied up in said server.

31. The method according to claim 26, wherein a terminal device that makes a response and a terminal device that makes no response are respectively counted up in said server.

32. The method according to claim 26, further comprising a step of issuing a completion request of a tallying process from said terminal device to said server, wherein the tallying process is completed in said server when the completion request is issued from said terminal device.

33. The method according to claim 26, further comprising a step of generating data to be transmitted to said terminal device based on tallied data in said server.

34. The method according to claim 26, further comprising a step of clearing previous counting value data in said server.

35. The method according to claim 26, wherein the data transmitted from said terminal device to said server is text data.

36. A non-transitory computer readable storage medium having computer readable program for operating on a computer for making the computer used as a server device connected to a network, said program comprising instructions that cause the computer to perform the steps of:
tallying data received at the server from a plurality of terminal devices through said network, said server device comprising a group list management unit comprising at least a say for terminal devices, the say set to EXISTING during the PT call; and
transmitting counting result data to each of the terminal devices having a say of EXISTING.

37. The non-transitory computer readable storage medium according to claim 36, wherein said step of tallying data is performed when a tally request is issued from said terminal device.

38. The non-transitory computer readable storage medium according to claim 36, further comprising a step of transmitting invitation message data to said terminal device.

39. The non-transitory computer readable storage medium according to claim 36, wherein the step of tallying data is performed on the data received within a predetermined time.

40. The non-transitory computer readable storage medium according to claim 36, wherein the step of tallying data is performed on the data selected by said terminal device among alternatives.

41. The non-transitory computer readable storage medium according to claim 36, further comprising a step of separately counting a terminal device that makes a response and a terminal device that makes no response.

42. The non-transitory computer readable storage medium according to claim 36, further comprising a step of completing a tallying process of data when a completion request is issued from said terminal device.

43. The non-transitory computer readable storage medium according to claim 36, further comprising a step of generating data to be transmitted to said terminal device based on tallied data.

44. The non-transitory computer readable storage medium according to claim 36, further comprising a step of clearing previous counting value data.

45. A non-transitory computer readable storage medium having computer readable program for operating on a computer for making the computer used as a terminal device connected to a network, said program comprising instructions that cause the computer to perform the steps of:
    transmitting data to a server connected through said network during a PTT call, said server comprising a group list management unit comprising at least a say for terminal devices, the say set to EXISTING during the PTT call; and
    receiving counting result data from said server and outputting the counting result data to terminal devices, each terminal device having a say of EXISTING in the group list management unit.

46. The non-transitory computer readable storage medium according to claim 45, further comprising a step of issuing a tally request to said server.

47. The non-transitory computer readable storage medium according to claim 45, further comprising a step of outputting an invitation message when invitation message data is transmitted from said server.

48. The non-transitory computer readable storage medium according to claim 45, further comprising a step of issuing a completion request of a tallying process to said server.

* * * * *